(12) United States Patent
Boulais et al.

(10) Patent No.: US 9,524,809 B1
(45) Date of Patent: Dec. 20, 2016

(54) OPTICALLY CONTROLLABLE COMPOSITE DIELECTRIC

(71) Applicants: Kevin A. Boulais, La Plate, MD (US); Simin Feng, Waldorf, MD (US); Pearl Rayms-Keller, Fredericksburg, VA (US); Michael S. Lowry, Fredericksburg, VA (US); Francesco Santiago, Spring Hill, FL (US)

(72) Inventors: Kevin A. Boulais, La Plate, MD (US); Simin Feng, Waldorf, MD (US); Pearl Rayms-Keller, Fredericksburg, VA (US); Michael S. Lowry, Fredericksburg, VA (US); Francesco Santiago, Spring Hill, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/960,440

(22) Filed: Dec. 7, 2015

Related U.S. Application Data

(60) Provisional application No. 62/219,036, filed on Sep. 15, 2015.

(51) Int. Cl.
| | |
|---|---|
| C08L 33/12 | (2006.01) |
| H01B 3/44 | (2006.01) |
| C09D 133/12 | (2006.01) |
| C09D 11/00 | (2014.01) |
| C08K 3/10 | (2006.01) |

(52) U.S. Cl.
CPC ............. *H01B 3/447* (2013.01); *C09D 11/00* (2013.01); *C09D 133/12* (2013.01); *C08K 3/10* (2013.01)

(58) Field of Classification Search
None
See application file for complete search history.

(56) References Cited

U.S. PATENT DOCUMENTS

| 7,005,669 B1 * | 2/2006 | Lee ........................ B82Y 10/00 257/14 |
| 8,791,707 B2 | 7/2014 | Bowler et al. ................ 324/658 |

OTHER PUBLICATIONS

Huang et al., Ceramics International 36 (2010) 1245-1251.*
Mishra et al., Journal of Alloys and Compounds 539 (2012) 1-6.*
Chen et al., ACS Appl. Mater. Interfaces 2015, 7, 45-50.*
Boulais et al., IEEE Transactions on Electron Devices, vol. 60, No. 2, Feb. 2013, pp. 793-798.*
T. Chen et al.: "Analysis of a concentric coplanar capacitive sensor using a spectral domain approach", *Review of Progress in Quantitative Nondestructive Evaluation* 30 AIP Conf. Proc. 1335 1647-1654 (2011). http://lib.dr.iastate.edu/cgi/viewcontent.cgi?article=1041&context=cnde_conf.

\* cited by examiner

*Primary Examiner* — Vu A Nguyen
(74) *Attorney, Agent, or Firm* — Gerhard W. Thielman, Esq.

(57) ABSTRACT

A dielectric composite material is provided for switch control by optical stimulus. The material includes a plurality of photo-conductive particulates; and a transparent binder for containing the plurality of particulates to form a photo-conductive pigment based matrix. The pigment based matrix is disposed on to overlap first and second separate electrodes to produce an electrical junction. Capacitance of the pigment based matrix changes from a first value absent the optical stimulus to a second value in response to illumination at a specific electromagnetic frequency and intensity by the optical stimulus.

4 Claims, 7 Drawing Sheets

OPTICALLY CONTROLLABLE COMPOSITE DIELECTRIC

CROSS REFERENCE TO RELATED APPLICATION

Pursuant to 35 U.S.C. §119, the benefit of priority from provisional application 62/219,036, with a filing date of Sep. 15, 2015, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to dielectric materials in which the constituent dielectric properties can be adjusted by optical control. In particular, this invention relates to techniques for producing a dynamically controllable artificial dielectric (AD).

Composite dielectrics are of high interest because their electromagnetic properties can be controlled synthetically. In particular, the method of mixing several dielectric components together to achieve a final effective permittivity is useful for many electromagnetic applications and examples have been around for more than a century. As one example, there may be a need for a particular permittivity to obtain a specific electromagnetic impedance to minimize radio frequency (RF) reflection.

A composite material in which at least one of the components is a good conductor is referred to as an artificial dielectric as coined by W. E. Kock, "Metallic delay lenses," *Bell Systems Technical Journal*, 27 (1), 59-82 (January 1948). The term "artificial dielectric" is used to distinguish the polarization properties of a conductor from that of an insulating dielectric. The conductor consists of what is known to those skilled in the art as "free" charge whereas a dielectric insulator consists of "bound" charge. Either achieves a similar polarization response to an applied electric field. A dynamic photo-variable dielectric response can be realized by using a photo-conductive material as a component in the composite dielectric (H. Kallman et al., "Induced conductivity in luminescent powders. II. AC impedance measurements," *Phys. Rev.*, 89 (4) 700-707, February 1953). The dielectric permittivity constant of a photo-conductive material as a first component (component-1) can be represented by the complex relation:

$$\varepsilon_p = \varepsilon'_p - j\frac{\sigma}{\omega} \quad (1)$$

where $\in'_p$ is the real part of the permittivity, $j=\sqrt{-1}$ is the imaginary number, $\sigma$ is the photo-conductivity, $\omega$ is the angular frequency and the subscript p means photo-conductive particulate. In eqn. (1), the imaginary component stems only from conductivity and is assumed to be much larger than from other dielectric loss effects.

For the case of a two-element material, the permittivity of the second component (component 2) can be represented simply as $\in_b$, where the subscript b refers to an insulating binder. Here the second component is treated as an insulator and so has conductivity of zero, i.e., $$\in_b = \in'_p. \quad (2)$$

Many dielectric mixing equations exist depending on geometrical and material parameters. One popular mixing equation known by those artisans of ordinary skill is the Lichtenecker equation (K. Lichtenecker: "Die Dielektrizitäts-konstante natürlicher and kunstlicher Mischkörper," *Physik. Zeits.* 27, 1926) given by:

$$\in = \in_1^{f_1} \in_2^{1-f_1} \quad (3)$$

where $f_1$ is the volumetric fill factor of component-1. Note that eqn. (3) is written for a two-component composite dielectric, but can be extended to multiple components (R. Simpkin: "Derivation of Lichtenecker's Logarithmic Mixture Formula from Maxwell's Equations," *IEEE Trans. Microwave Theory Tech.*, 58 (3) 545-550, March 2010.). This equation is generally appropriate for mixtures that are symmetric, meaning that geometrically the particles can be interchanged and the equation remains valid.

For the case that the photo-conductive component is within an insulating binder material, then another relation has been shown to be effective from Kevin A. Boulais et al.: "Optically Controllable Composite Dielectric Based on Photo-conductive Particulates", *IEEE Trans. Microwave Theory and Techniques*, 62 (7), 1448-1453 (June, 2014).

$$\varepsilon_e = \frac{\varepsilon_b[\varepsilon_b + (\varepsilon_p - \varepsilon_b)f^{2/3}]}{\varepsilon_b + (\varepsilon_p - \varepsilon_b)(f^{2/3} - f)} \quad (4)$$

In eqn. (4) the materials are not symmetric as might be the case for conducting particulates and an insulating and otherwise continuous binder.

SUMMARY

Conventional dielectrics yield disadvantages addressed by various exemplary embodiments of the present invention. In particular, exemplary embodiments provide a dielectric material for switch control by optical stimulus. The material includes photo-conductive particulates; and a transparent binder for containing the plurality of particulates to form a photo-conductive pigment based matrix. The pigment based matrix is disposed to overlap first and second separate electrodes to produce an electrical junction. Capacitance of the pigment based matrix changes from a first value absent the optical stimulus to a second value in response to illumination at a specific electromagnetic frequency and intensity by the optical stimulus.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an electric or electromagnetic circuit as a device to control the electromagnetic field.

Figure 1:
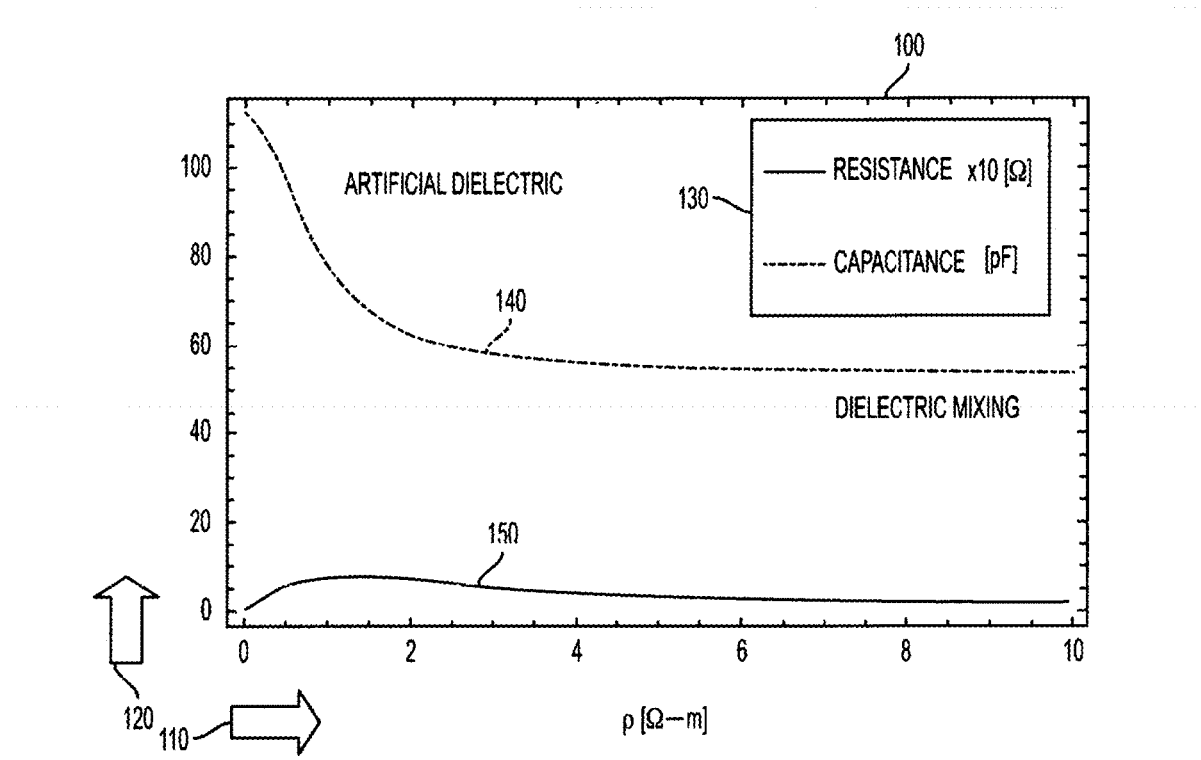
FIG. 1 is a graphical view of series resistance and capacitance of an artificial dielectric, as a function of resistivity of the particulates.

FIG. 1 shows a graphical view 100 of reactance and capacitance for an artificial dielectric (AD) as an electrical component. The abscissa 110 denotes resistivity of the particulate material or pigment (ohm-meters) while the ordinate 120 denotes resistance in tens of ohms ($\Omega$) and capacitance in picofarads (pF). A legend 130 identifies variation curves for capacitance 140 and resistance 150 for a series RC circuit.

Figure 2:
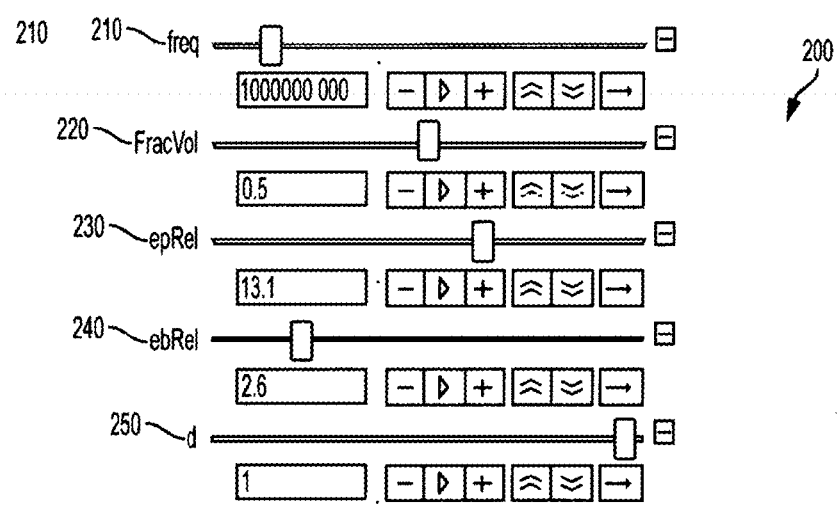
FIG. 2 is a visual scale view for parameter setting for FIG. 1.

FIG. 2 shows a visual scale view 200 for parameter setting that produces the FIG. 1 curves. The sliding scales provide controls for frequency 210 in cycles-per-second (Hz), volume fraction 220, relative particulate permittivity 230, relative binder permittivity 240 and scale a geometric term 250.

Figure 3:
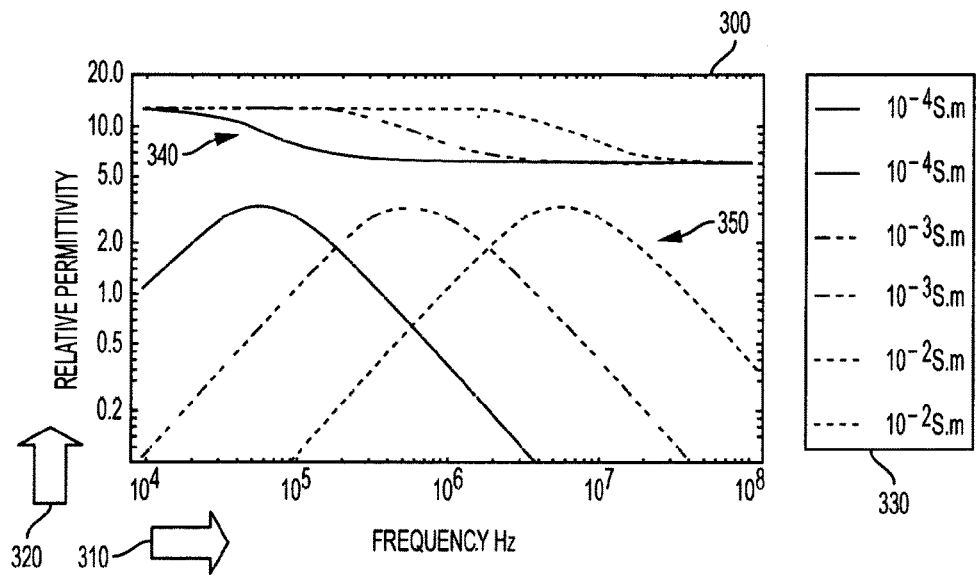
FIG. 3 is a graphical view of permittivity variation with frequency for different particulate conductivity values.

FIG. 3 shows a graphical view 300 of permittivity variation with frequency. The abscissa 310 denotes frequency in cycles-per-second (Hz), while the ordinate 320 denotes relative permittivity. A legend 330 identifies the real (upper) 340 and imaginary (lower) 350 curves for permittivity of three different photo-conductivities. These correspond to the particulates as solid lines at $10^4$, dash lines at $10^3$ and dot lines at $10^2$.

Figure 4:
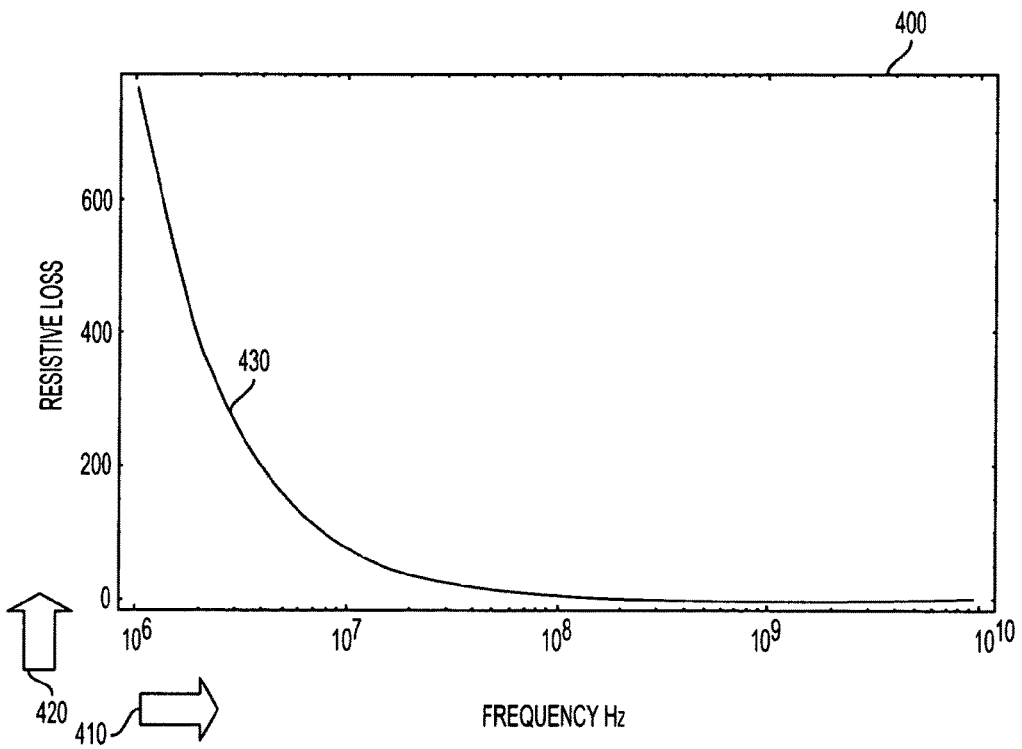
FIG. 4 is a graphical view of series resistive loss variation with frequency.

FIG. 4 shows a graphical view 400 of resistive loss variation with frequency. The abscissa 410 denotes frequency (Hz), while the ordinate 420 denotes resistive loss of the optically controllable composite dielectric in an RC circuit configuration. A variation curve 430 shows decrease in loss with increasing frequency.

Figure 5:
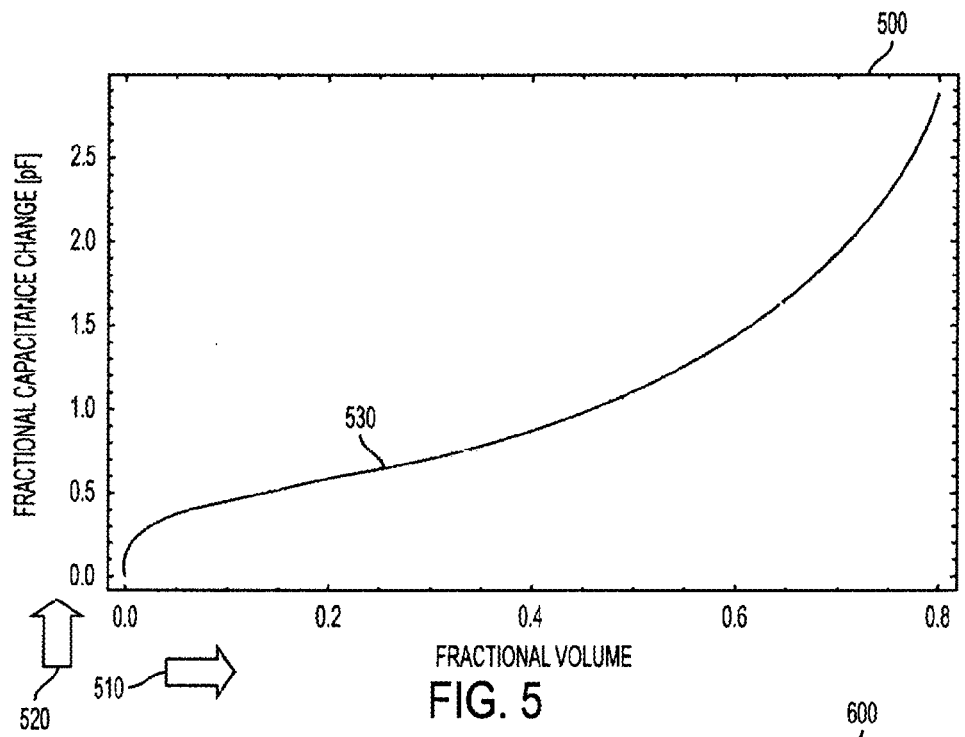
FIG. 5 is a graphical view of fractional series capacitance change as a function of particulate volume variation.

FIG. 5 shows a graphical view 500 of fractional capacitance variation with normalized fractional volume. The abscissa 510 denotes normalized fractional volume, while the ordinate 520 denotes fractional change in capacitance (pF). A variation curve 530 shows increasing capacitance range as volume rises.

Figure 6:
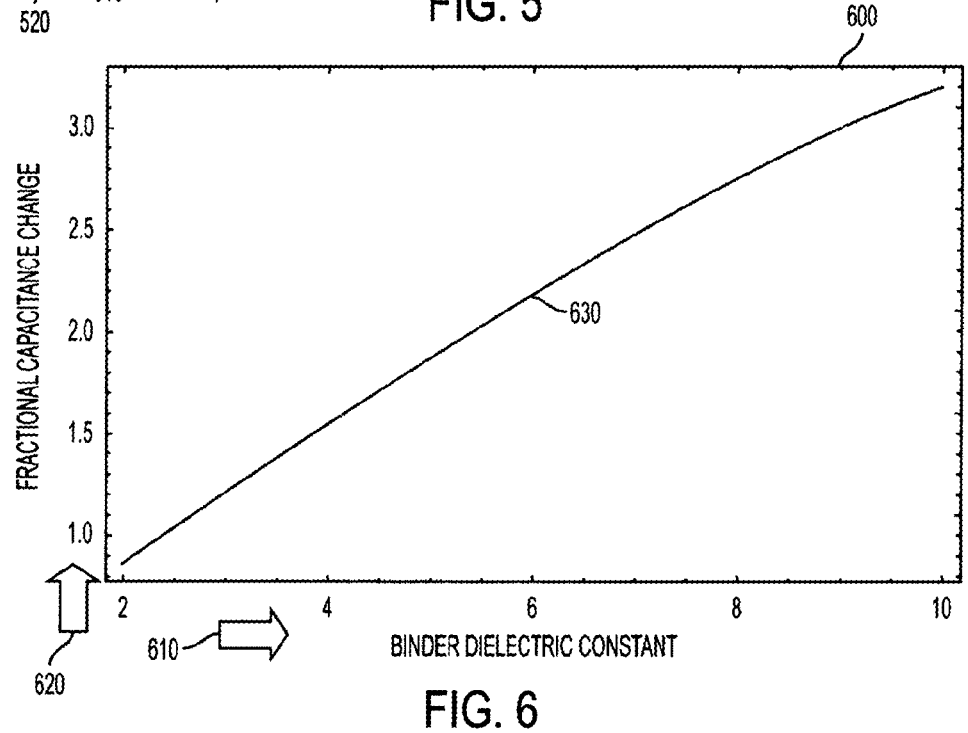
FIG. 6 is a graphical view of series capacitance change as a function of binder dielectric constant.

FIG. 6 shows a graphical view 600 of fractional capacitance variation with binder dielectric constant. The abscissa 610 denotes binder dielectric constant, while the ordinate 620 denotes fractional change in capacitance (pF). A variation curve 630 shows increasing capacitance range as the binder dielectric increases.

Figure 7:
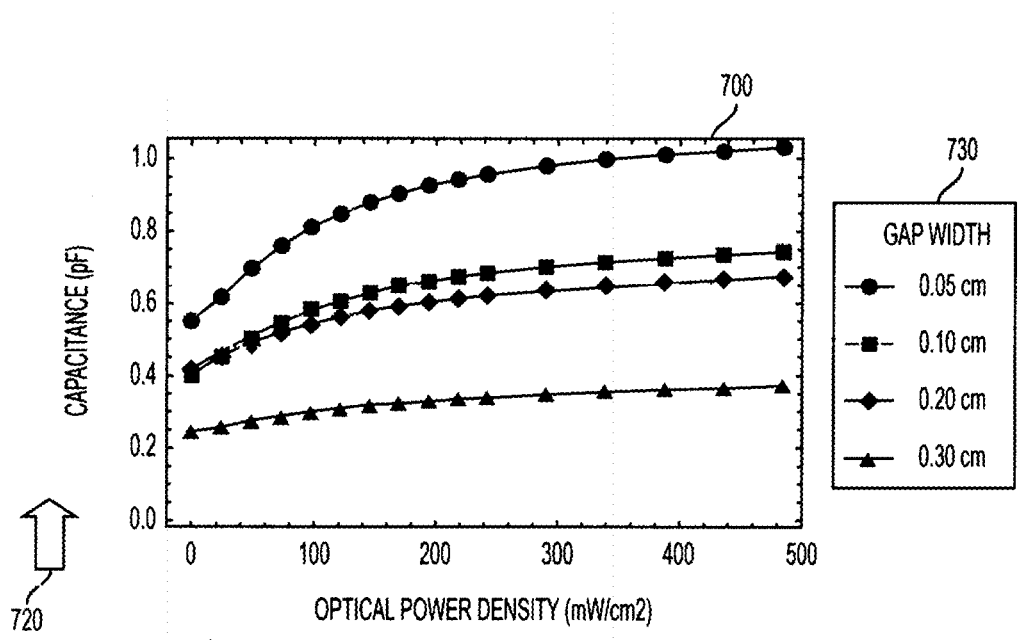
FIG. 7 is a graphical view experimental data of optical power density variation with capacitance using undoped semi-insulating GaAs as the particulate material.

FIG. 7 is a graphical view 700 of experimental results for series capacitance as a function of optical power density. The abscissa 710 denotes optical power density in milliwatts-per-square-centimeter (mW/cm$^2$), while the ordinate 720 denotes capacitance (pF). A legend 730 identifies separate variations for gap widths of 0.05 cm (circles), 0.10 cm (squares), 0.20 cm (diamonds) and 0.30 cm (triangles). The capacitance asymptotically approaches a level as power density increases, with the limit decreasing as gap width increases.

Figure 8:
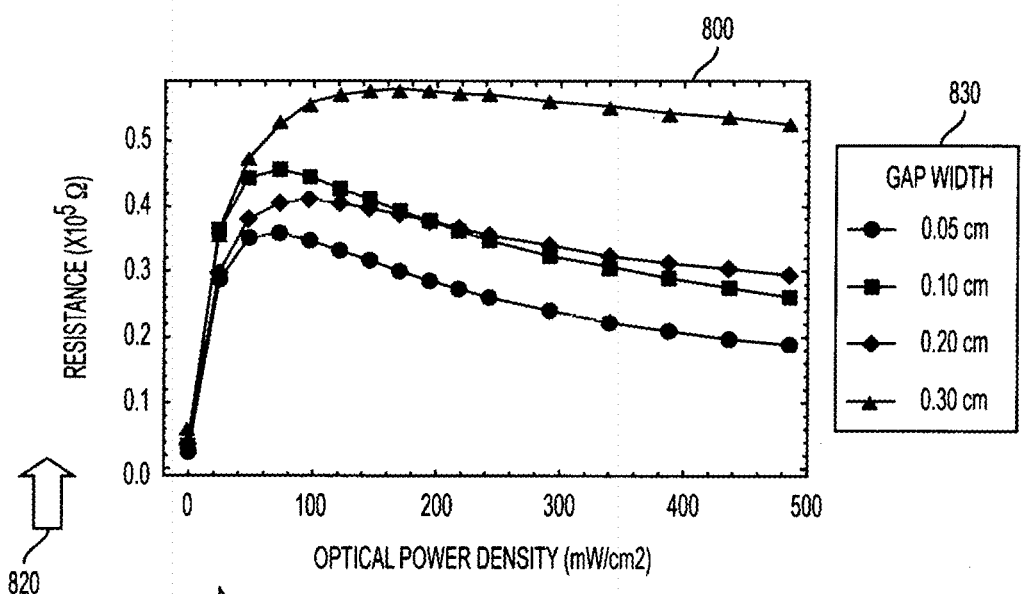
FIG. 8 is a graphical view of experimental data of optical power density variation with resistance with undoped semi-insulating GaAs as the particulate material.

FIG. 8 shows a graphical view 800 of experimental results for series resistance variation with optical power density variation. The abscissa 810 denotes optical power density (mW/cm$^2$), while the ordinate 820 denotes resistance (tens-of-thousands of ohms). A legend 830 identifies separate variations for gap widths of 0.05 cm (circles), 0.10 cm (squares), 0.20 cm (diamonds) and 0.30 cm (triangles). The resistance rises to separate peaks after rising from near zero and asymptotically approaches a level as power density increases, with the limit decreasing as gap width increases.

Figure 9:
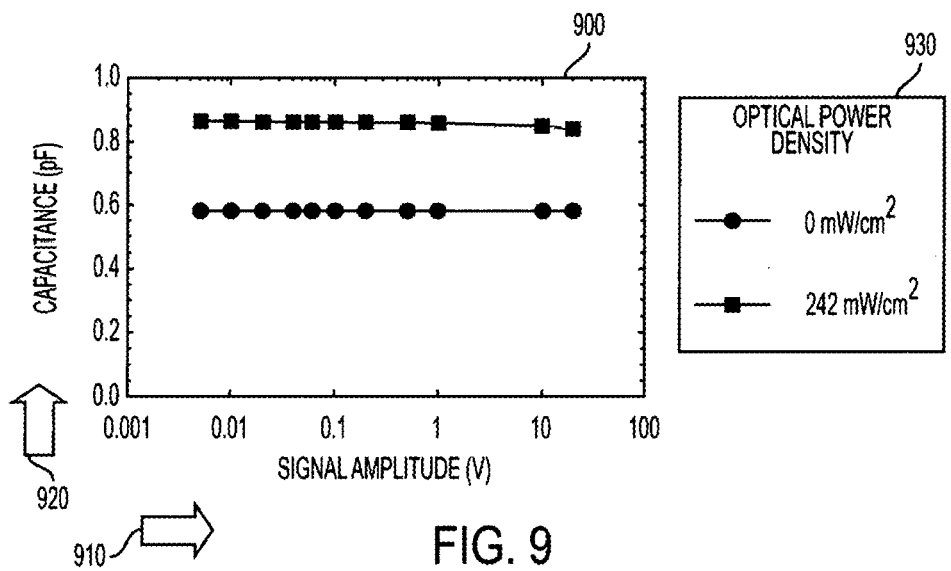
FIG. 9 is a graphical view 900 of capacitance showing minimal variation with signal amplitude.

FIG. 9 shows a graphical view 900 of experimental results for series capacitance variation with signal amplitude. The abscissa 910 denotes signal amplitude in volts (V), while the ordinate 920 denotes capacitance (pF). A legend 930 identifies separate variations for optical power density of 0 mW/cm$^2$ (circles) and 242 mW/cm$^2$ (squares). The capacitance remains substantially level across the amplitude range for both power density values.

Figure 10:
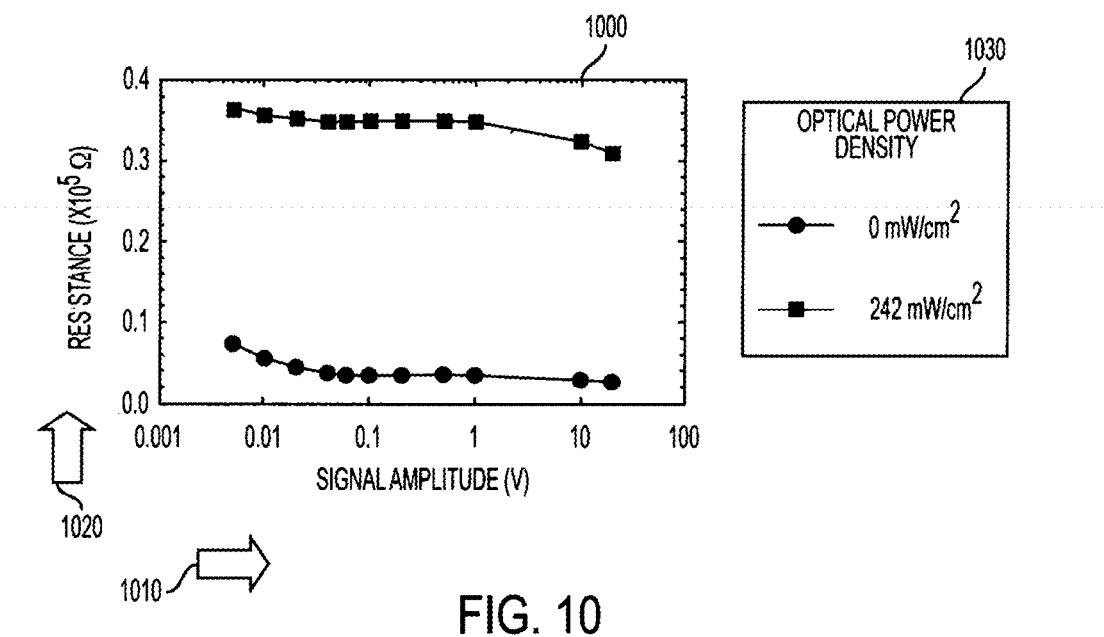
FIG. 10 is a graphical view 1000 of resistance showing minimal variation with signal amplitude.

FIG. 10 shows a graphical view 1000 of experimental results for series resistance variation with signal amplitude. The abscissa 1010 denotes signal voltage amplitude (V), while the ordinate 1020 denotes resistance (tens-of-thousands of ohms). A legend 1030 identifies separate variations for optical power density of 0 mW/cm$^2$ (circles) and 242 mW/cm$^2$ (squares). The resistance levels increase with power density and indicate only minor decrease with increasing signal amplitude.

An important aspect of the optically controllable composite dielectric is that the net capacitance and resistance remain relatively constant over a wide range of signal voltage. FIGS. 9 and 10 show the measured capacitance and resistance for a typical sample as a function of signal voltage for two different optical power densities. There is a clear tendency towards signal voltage independence. This is in contrast to the common varactor method of tuning electromagnetic devices. Varactors use voltage controlled depletion capacitance, rendering them inherently non-linear with signal voltage. Results are shown for two different optical power densities. View 900 capacitance and view 1000 resistance measurements of the composite dielectric showing near linearity with signal voltage ranging from 5 mV to 20 V.

Figure 11:
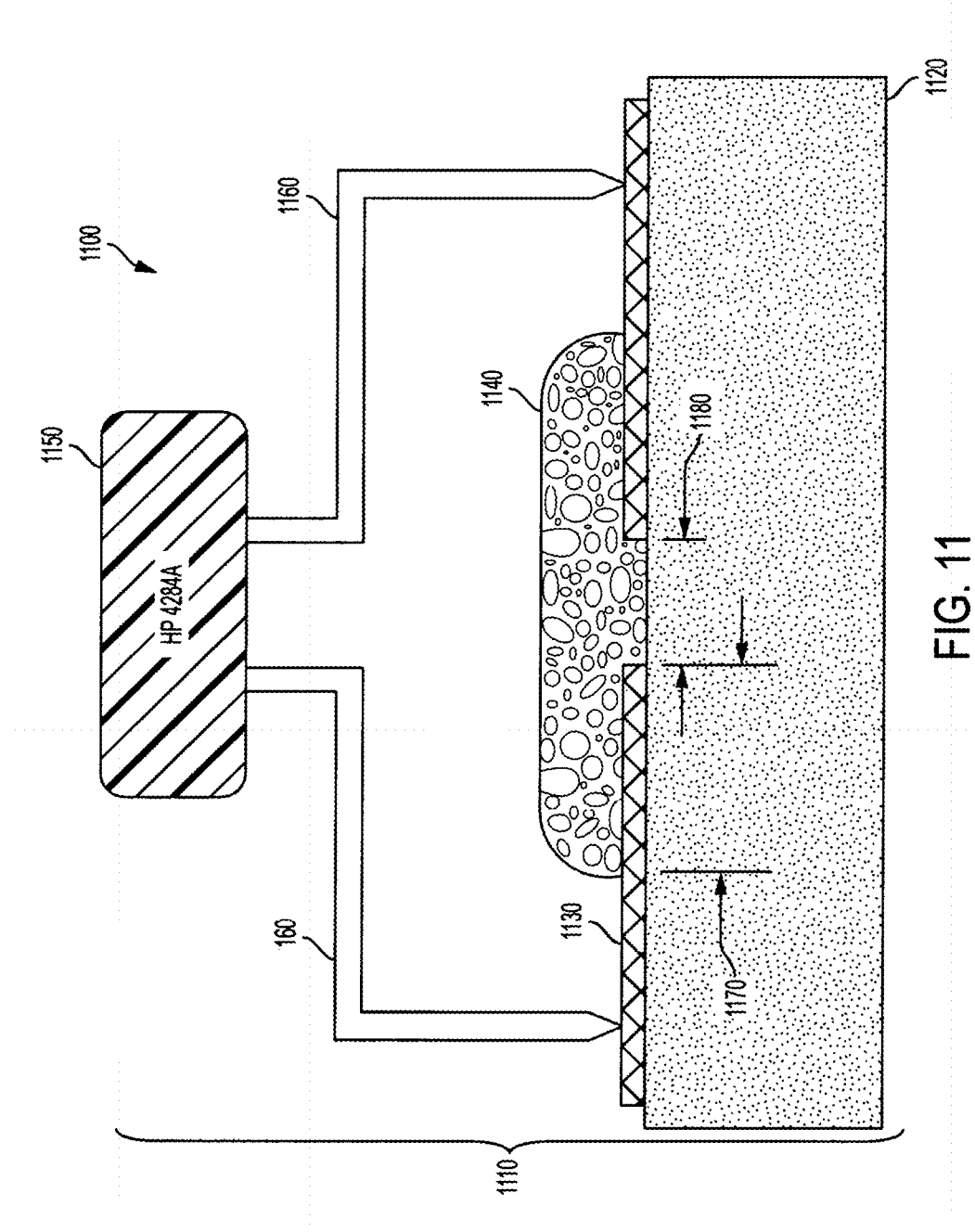
FIG. 11 is an elevation cross-section view of an exemplary device for an optically controllable composite dielectric.

FIG. 11 shows an elevation cross-section view 1100 of an experimental arrangement 1110 to measure an optically controllable composite dielectric. A substrate 1120 composed of FR-4 glass reinforced epoxy laminate designed for printed circuit boards substrate is used to lay out a circuit. A pair of copper electrodes 1130 are disposed on the substrate 1120 separated by a gap that is bridged by a composite photo-capacitive ink 1140, whose composite dielectric is to be measured. An HP-4284A meter 1150 has connectors 1160 to each electrode 1130 to complete the electric circuit.

The ink 1140 forms an overlap with the electrode 1130 of an overlap length 1170, and the gap between the electrodes 1130 has a width 1180. The ink 1140 is composed of undoped semi-insulating gallium arsenide or silicon particulates in a poly(methyl methacrylate/urethane resin) binder. In tests, the electrode gap widths 1180 varied between 0.05 cm and 0.3 cm, and the length of the gap 1170 was 0.5 cm for all cases.

Figure 12:
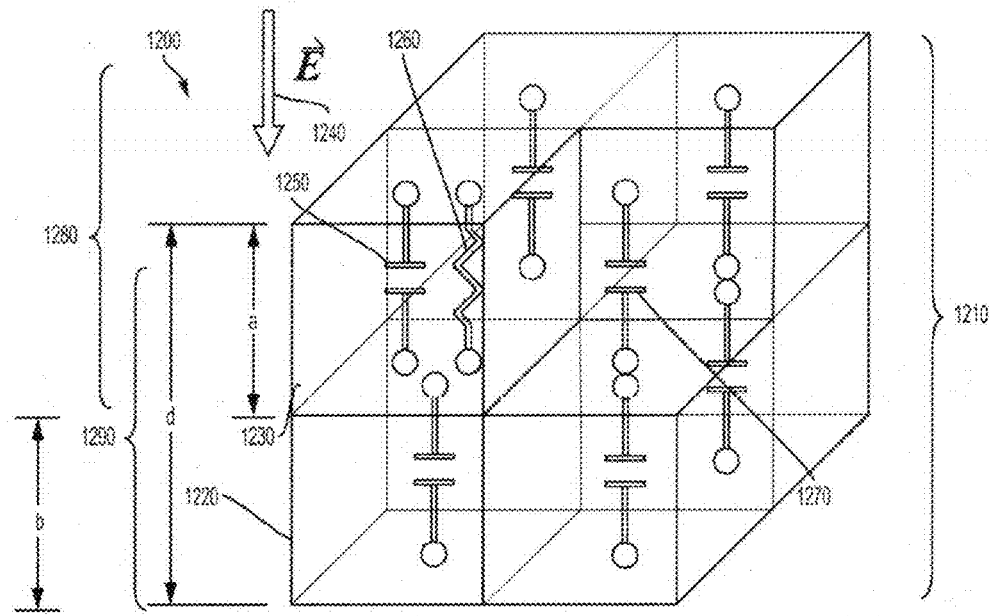
FIG. 12 is an isometric view of capacitors and resistors modeled within an electric field used to develop the model.

FIG. 12 shows an isometric view 1200 of a mathematical three-dimensional cell model 1210 with side dimensions of d. The model 1210 comprises medium cells 1220 (that serve as a binder) with an RC particulate cell 1230 with side dimensions of a and disposed within an electric field $\vec{E}$ 1240. The RC particulate 1230 includes a capacitor 1250 and a resistor 1260. The neighboring cells for the binder 1220 include capacitors 1270, but do not impart electrical resistance.

Figure 13:
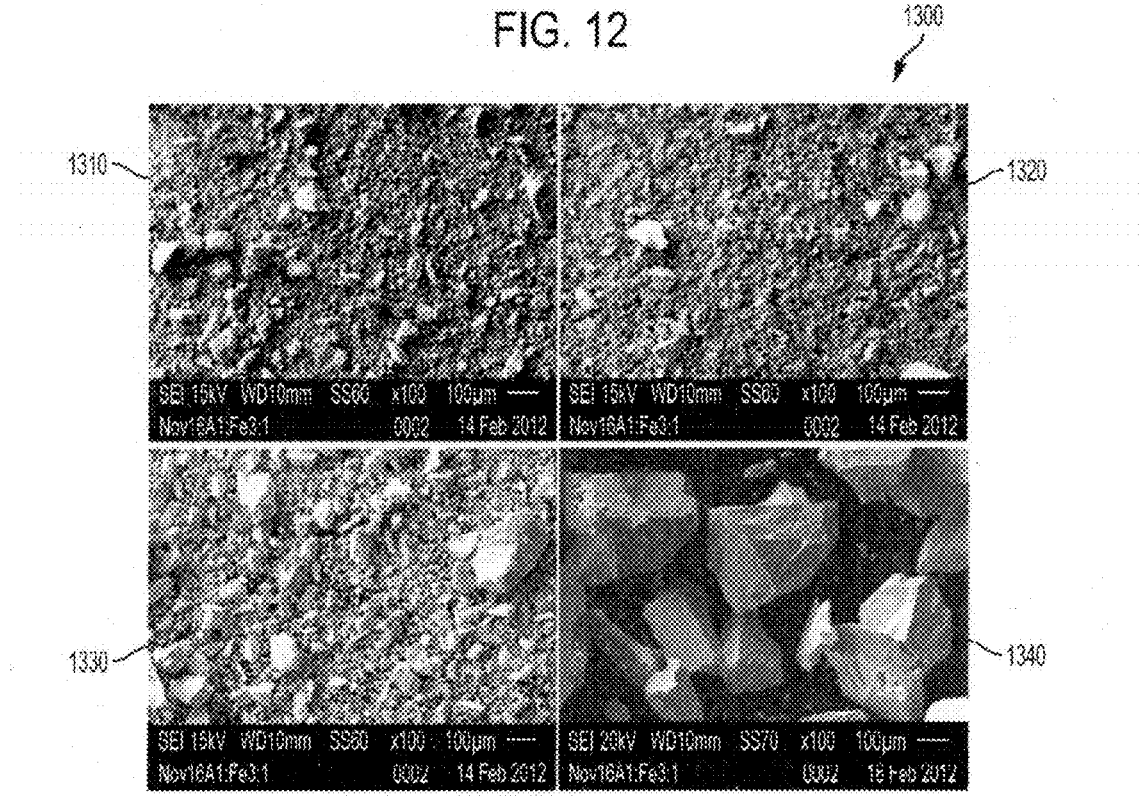
FIG. 13 is a microscopic enlargement view of particulates.

FIG. 13 shows a microscopic enlargement view 1300 of particulates 1230 fabricated from undoped semi-insulating (USI) gallium-arsenide (GaAs). Other photo-sensitive materials, such as silicon (Si) can be used and are not limiting. Frames 1310, 1320, 1330 and 1340 provide images of different stages of sorting and sizing of particulates.

Exemplary embodiments provide techniques to incorporate materials in photo-controllable composite dielectrics using high photo-absorptive materials. Practical photo-controllable composite dielectrics require tradeoffs in design to achieve a desired parameter space of operation. One tradeoff is the desire to use highly photo-conductive particulates as the active component in the composite, which has the detrimental effect of limiting the thickness of the material to very thin geometries. For example, utilizing band-to-band transitions of particulates fabricated from semi-conducting materials can limit the optical penetration depth.

Incorporating eqn. (1) into eqn. (4), the effective permittivity is found to change with conductivity. FIG. 3 illustrates a plot of eqn. (4) for three different conductivity values, with the top curves 340 representing the real part of the permittivity, while the bottom curves 350 are the imaginary part of the permittivity, which shows frequency dispersion. As conductivity increases, the curves sweep from left to right towards higher frequencies. As the curves sweep past a selected frequency, the effective permittivity changes, thus showing photo-control of the permittivity.

Such a photo-controllable composite dielectric has been demonstrated in which the photo-conductive particulate was undoped semi-insulating (USI) GaAs and the binder component was poly(methyl methacrylate/urethane resin) (PMMA/U). See Boulais *IEEE TMTT* (2014). USI GaAs demonstrates one advantage of using semi-conducting or semi-insulating particulates that have deep level traps, because light can penetrate deep throughout the material.

FIG. 3 shows solid, dash and dot curves 350, 360, 370 showing the variation in permittivity for three different conductivity values. By increasing the conductivity, for example by photo-injection, the curves sweep from left to right. At a given frequency, the material has a corresponding increase in the effective permittivity. The top curves 340 are the real portion, and the bottom curves 350 are the imaginary portion of the permittivity. As can be observed by the dotted curve in FIG. 3, a higher conductivity range is necessary to control the permittivity at around $10^7$ Hz.

Using higher intensity light is possible to accomplish this, but the alternative method would not be efficient because much of the energy would merely shift the curve to the higher range of frequencies. A more advantageous solution involves a material with a higher value of conductivity at a lower intensity of light to sweep the curve past $10^7$ Hz. This renders a more controllable composite dielectric that is more sensitive to light and more efficient.

The selection of natural materials with a desired conductivity can be limiting. In the case of crystalline or organic semiconductors, conductivity is often controlled by doping the material with impurities. The absorption rate can be high when bandgap material is used because direct electron-hole pair generation stems from the lattice atoms instead of the impurities. High absorption can be desirable due to enhanced sensitivity to light, but this can also be less optimal because of limitations in the penetration depth of light. In the case of composite dielectrics, high absorption could limit the light from reaching particulates that are deeper within the material and thereby diminishing controllability of the composite dielectric. Such materials would be limited to very thin inks.

For the aforementioned USI GaAs particulates case, light absorption was minimal enabling light to reach particulates very deep within the composite. The selected wavelength of light only interacted with deep level traps within the material in K. A. Boulais et al.: "Circuit analysis of photosensitive capacitance in semi-insulating GaAs", *IEEE Trans. Electron Devices*, 60 (2) 793-798 (February 2013). Direct electron-hole pair generation was suppressed. This led to a tradeoff in lowering sensitivity to light, and restricted the operable frequency range unless high intensity light was used.

Exemplary embodiments relate to a means to a photo-controllable composite dielectric in which the active particulates can be highly photo-absorptive, thus minimizing the need for the tradeoff between optical sensitivity and composite material thickness. Optical absorption is controlled geometrically instead of by material properties alone. Thus, highly absorptive materials can be used while permitting light to penetrate deeper into the composite dielectric to reach particulate throughout. The exemplary technique removes the restriction of low optical absorption for a tunable composite dielectric, such as in the case of conventional USI GaAs. In turn, this process enables new materials to be used that cover a broader range of frequencies while also having higher sensitivity to light.

Here, any range of photo-conductivity can be used without concern of high optical absorption. An example of a material might be a semi-conductor that photo-conducts by light absorption creating direct electron-hole pairs. Absorption in many such materials can be excessive, thereby limiting light penetration to 100 μm for example. Thus, if the optically controllable artificial dielectric (AD, e.g., ink 1140) is only 1 μm thick, then light can reach approximately fifty particulates deep.

Photo-capacitive and Photo-resistive Ink: Based on conductive particulates in binder matrix, one desires to produce a practical and affordable manner of large area (square meters to several square miles) manufacturing of tunable metamaterial (MM) medium and other tunable electronic devices. Exemplary embodiments provide a liquid suspension that covers the surface of insulators, fill cavities or likewise and become part of an electrical circuit.

Alternatively, exemplary embodiments include a solid with particulates imbedded within that are distributed homogeneously or non-homogeneously. For example, a wax material can be used and when heated, the wax flows as an ink 1140 that includes the particulates. When dried, cured or otherwise solidified, this material (herein called liquid suspension) changes the effective capacitance of the covered (or filled) medium to any electrical signal traveling through the medium when illuminated with light.

This change in capacitance is related to a functional dependence of the intensity of light. The functional dependence could be linear, logarithmic or any other mathematical form depending on the particulate material of choice, such as USI GaAs and Si. Weak intensities of the illuminating light produce small capacitance changes and high intensities of the illuminating light will produce large capacitance changes. In addition, the change in capacitance can be inversely proportional to any mathematical form that describes the intensity of the illuminating light.

The liquid suspension components (e.g., binder 1220) will also determine the sensitivity to light and which type of light (infrared, visible, ultraviolet) produces the desired effect. In addition, the particle size and volumetric fraction of the suspension's components affect the optically controllable AD properties under illumination and both properties can be used as parameters to design a medium that satisfies specific requirements for the electronic circuit of interest. The active component of the ink 1140 is the particulates 1230, but the binding matrix can play an important role to enhance the effect.

There are two fundamental mechanisms to transfer an electrical signal through an arbitrary medium, such as the binder 1220: conduction and induction. Here the actual electrical charges move through the binder medium with an effective drift velocity. The ability of an electrical charge to travel through the medium varies greatly from material to material. This property is known as the conductivity of the medium or its reciprocal known as the resistivity.

Conductivity and resistivity are the two physical parameters known with the highest ratio between the largest known value and the smallest. For known values, the ratio of conductivity-to-resistivity between the most conductive materials known (not including superconductors) to the least conductive is on the order of $10^{32}$. When superconductors are considered, this ratio effectively becomes infinitively large.

Another way that electrical signals can travel through a medium is by the mechanism known as displacement. Here the electrical charges do not physically travel through the medium, but rather the electrical information travels by changing the polarization of sectors imbedded in the medium. Materials with imbedded polarization are classed as dielectrics, and the property that measures this property is the dielectric constant. There is a large range of dielectric values among the materials, but not nearly as large as in the case of conductivity. For an electrical signal travel via displacement must vary with time.

An example of time-varying electrical signal is the alternating current (AC) that feeds electricity to home appliances. An ideal insulator is a medium that does not permit any conduction but enables displacement. Such medium can be placed between two conductors in a manner that electrical energy can be stored in such device. This device is commonly known as a capacitor or condenser. Since the early days of electronics, the value of a capacitor has been recognized. Capacitors are used in almost every circuit that uses AC electricity.

By varying the dimensions of the electrodes and insulator, different values of capacitance can be achieved. Traditionally, when a capacitor capable of a capacitance change is used, the capacitance change is achieved by mechanical means. This means that somehow either changing the relative surface area of the electrodes, or changing the distance of the gap between the electrodes, using mechanical devises, achieves the required capacitance. Mechanical devises are very slow compared to the times required in some applications (durations as small as $10^{-9}$ sec). For applications where mechanical actuators cannot be used, changing the capacitance using light could be the desired solution.

Photo-capacitance is the ability to change the effective capacitance of a medium using light. In the 1970s many researchers used this property to characterize the electrical properties of GaAs and as a quality control criterion. GaAs photo-capacitance is optimally produced by infrared light (approx. 0.950 μm wavelength) when using sub-bandgap light energies that interact with deep level traps.

A very simple and effective photo-capacitor can be made by placing a GaAs wafer between two metal electrodes and impose illumination. When such device is connected to a high frequency AC resonant electric circuit, the resonance frequency will change by changing the intensity of the infrared light. Boulais *IEEE TED* (2013) demonstrated the ability of GaAs tuning a split-ring resonator (SRR) from 100 MHz up to 1.8 GHz by changing the intensity of infrared light illuminating a GaAs crystal placed in the "gap" of the ring. An SRR is an electrical structure that consists of a conductor shaped as a ring with a small gap. The gap is used to provide the ring with capacitance. These structures have been extensively studied in the last fourteen years because of artisan interest in electromagnetic metamaterials.

Metamaterials are periodic structures of electrical devices. These structures potentially have the ability to show electromagnetic properties like electrical permittivity and magnetic permeability very different to any known natural material. Metamaterials can have remarkable properties, but they are inherently resonant structures. This means that they tend to exhibit their properties in one narrow frequency value, including the development of tunable metamaterials.

The results of Boulais *IEEE TED* (2013) are the first to demonstrate the possibility of a large bandwidth tunable metamaterial. However, satisfaction of military (and commercial) needs by metamaterials requires developing the capability to manufacture large structures in an economical and practical way. These GaAs single crystal photo-capacitors placed in the SRR's gap are not a cost-effective solution to the manufacturing process. A better solution is an ink substance that can be printed on split-ring gaps at large area fast production factories. The manufacturing process can be accomplished with the exemplary photo-capacitive ink 1140. Exemplary devices can be used to tune any device as well as frequency selective surfaces and non-periodic structures, and not only metamaterials.

Exemplary embodiments provide a medium that features an electrical capacitance or conductance change when illuminated with light. The components within the medium include photoconductive pigment, such as from semiconductor particulates 1230 (e.g., USI GaAs and Si). The medium features photo-capacitance in powder form, other types of photoconductive media also in powder form, and any binder 1220 that could be solvent-based. Binders could include thermoplastic solid materials, such as wax.

In all methods, the powder components may be surface modified to enhance compatibility with the binder. The exemplary sample used poly-(methyl methacrylate) (or PMMA) as the polymer, intrinsic GaAs in powder form, and acetone or $(CH_3)_2CO$ as the solvent. An alternate exemplary sample used semiconductor grade wax, such as Aremco Products Inc. Crystalbond™ 509 (translucent to the frequency of infrared light being used), and intrinsic GaAs in powder form.

The purpose of the dielectric is to create large capacitance between the particulates 1230. The purpose of the particulate 1230 (that form the pigment) is to provide a lossy capacitance in which the loss is optically controlled. All the components are mixed in solution and the suspension is applied in the part of the circuit component to be tuned using light. Thus, the real part (curves 340) of the dielectric constant of the medium mixture can be adjusted by optically controlling the imaginary part (curves 350) of the dielectric through the Kramers-Konig relation, which is well known to artisans of ordinary skill.

Prior to mixing, the surface properties of the powder materials may be adjusted using surface modifying groups, such as alkyl-silane or alkyl-phosphonate molecules, to enhance integration with the other mixture components. (Alkyl-phosphonates are esters of phosphoric acid.) The suspension is permitted to completely dry. Once dried the newly formed electrical photocapacitor is connected to a high frequency AC electrical circuit. The resonant frequency of the AC circuit is measured, and the ink 1140 is illuminated with light. In exemplary embodiments, a solid-state infrared laser has been used to illuminate at an infrared wavelength of 0.950 μm. The intensity of the light is varied, and the resonant frequency of the circuit changes.

A mathematical model can be used to clarify the electrical behavior of the tunable pigment based ink 1140 in an example configuration. The model 1210 defines the ingredients of the ink 1140 in terms of electrical components 1250, 1260 and 1270. The behavior is then clearly evident even though in practice the physical implementation can be quite different. For example, the model 1210 assumes a periodic arrangement of unit cells 1220 (medium) and 1230 (particulate), but in practice the arrangement can be random.

In the exemplary model, the photo-sensitive pigments component of the optically controllable AD or ink 1140 in one such application are particulates of semiconducting or semi-insulating materials. However, they can also be other materials such as photo-conductive polymers, photo-sensitive molecular doped polymers, liquid crystal powder, and barium titanate ($BaTiO_3$) powder, for example. Thus, a single particulate can be represented electrically as a parallel combination of one resistor 1260 and one capacitor 1250. The binder 1220 surrounding the particulates 1230 forming the matrix is assumed to be purely insulating and is represented in terms of pure capacitance 1270.

The binder 1220 must be transparent or translucent to the photon-energy such that light can reach pigment material deep within the material, although exceptionally thin inks 1140 might not require this restriction (single layer for example). The light causes an increase in conductive charge which changes the electric and magnetic dipole moment of the particulate 1230.

Although it is not necessary, binder materials with high dielectric constant and low loss tangent have better performance because high permittivity can increase the tuning range of capacitance and resistance. Candidate materials for the binder 1220 can be, but not limited to, polymer ceramic (e.g., polysiloxanes), strontium titanate (SrTiO), titanium dioxide ($TiO_2$), and magnesium titanate ($MgTiO_3$). The model 1210 assumes a periodic arrangement of unit cells consisting of particulates 1230 and binder 1220 that are arranged in a block-like structure. Further, magnetic materials can be added to the binder material to control the magnetic properties. This enables different ranges of optically controllable impedance materials.

FIG. 12 shows the unit cell model 1210 of a periodic arrangement of active cubic elements in a tunable ink 1140. The smaller cube 1230 of dimension a represents a particulate of pigment, and the larger material 1220 around the pigment represents the binder matrix. The particulate spacing is b, and the periodicity of the cubic structure is d. For clarity, the unit cell model 1210 can be divided into two layers. The first layer 1280 includes the particulate and the surrounding binder material and is of thickness a. The second layer 1290 includes pure binder of thickness b.

The resistance 1260 of the particulate 1220 alone is given by:

$$R_{1p} = \rho \frac{a}{a \cdot a}, \tag{5}$$

where ρ is the resistivity that influenced with light intensity. For semiconductors, $$\rho = \frac{1}{q(\mu_n n + \mu_p p)}, \tag{6}$$

where $\mu_{n(p)}$ is electron (hole) mobility and n(p) is the electron (hole) density. (Terms are shown before and within parentheses as alternating parameters.)

The function of electron and hole density with light is well known to those skilled in the art as described in R. S. Muller et al.: *Device Electronics for Integrated Circuits* 2e, John Wiley & Sons, New York, 1986. The light can be greater than the bandgap of the particulate material, or less than the bandgap when traps exist within the bandgap. Such traps can occur naturally near the middle of the bandgap and are common in many forms of semiconducting material including GaAs, silicon carbide (SiC), and gallium nitride (GaN), for example.

The lossy capacitance of the particulate in the first layer 1280 is given by:

$$c_{1p} = \varepsilon_p \frac{a \cdot a}{a}, \tag{7}$$

where $\in_p$ is the dielectric constant of the particulate as provided by eqn. (1). The capacitance 1250 of the binder in the first layer 1280 is:

$$c_{1b} = \varepsilon_b \frac{a \cdot b + b \cdot b + b \cdot a}{a}, \quad (8)$$

where $\varepsilon_b$ is the dielectric constant of the binder, and the capacitance 1270 of the binder in the second layer 1290 is:

$$c_{2b} = \varepsilon_b \frac{a \cdot a + a \cdot b + b \cdot b + b \cdot a}{a}. \quad (9)$$

The impedance of the first layer 1280 is then the parallel combination of the corresponding impedances given by:

$$Z_{1p} = R_{1p} // \frac{1}{j\mu_p c_{1p}}, \quad (10)$$

where the operator // is the well-known symbol representing a parallel combination of electrical components.

The impedance of the second layer 1290 is then determined as:

$$Z_2 = \frac{1}{j\mu_b c_{2b}}. \quad (11)$$

The final impedance of a single cell is then the series combination (addition) of eqns. (10) and (11) given by:

$$Z_c = Z_{1p} + Z_2. \quad (12)$$

The volume fraction ratio of particulate matter is given by:

$$V_f = \left(\frac{a}{d}\right)^3. \quad (13)$$

To be useful in circuit application for example, the final form of impedance can be described as a series combination of resistance and capacitance. The photo-sensitive capacitance is a useful part of the tunable pigment based ink 1140 and is given by:

$$C_s = \frac{A}{L} \frac{\varepsilon_b \{V_f^{4/3} + \gamma^2 \rho^2 \omega^2\}}{(1 - V_f^{1/3})V_f^{4/3} + \gamma[\gamma + V_f(\varepsilon_b - \varepsilon_p)]\rho^2 \omega^2}, \quad (14)$$

where the equivalent dielectric term is:

$$\gamma = \varepsilon_b + V_f^{2/3}(\varepsilon_p - \varepsilon_b). \quad (15)$$

The net series resistance is:

$$R_s = \frac{L}{A} \frac{V_f \rho}{(V_f^{3/4} + \gamma^2 \rho^2 \omega^2)}, \quad (16)$$

where L is the overall length of the material in a direction parallel to the electric field (i.e., parallel to current flow), and A is the cross sectional area of the ink 1140 (perpendicular to current flow), which may also be a useful component depending on the circuit designers' intention. View 100 is a Mathematica (Wolfram Software, Urbana, Ill.) output of eqns. (14), (15) and (16) that shows variation in capacitance and resistance as a function of resistivity ρ, which in turn is a function of optical intensity. The resistance has been multiplied by ten for clarity.

Much information can be learned from these equations and from FIG. 1, which shows typical variation of capacitance and resistance as a function of ρ for values dielectric constants $\varepsilon_p = 13.1\varepsilon_o$ F/m (particulate), $\varepsilon_b = 2.6\varepsilon_o$ F/m (binder), frequency $\omega = 2\pi \times 10^6$ rad/s (i.e., 1 MHz), volume fraction $V_f = 0.5$ and area-to-length ratio A/L=1 m. Capacitance and resistance as a function of particulate resistivity for a frequency of 1 MHz.

The resistivity is controllable via light intensity. In the limit of infinite resistivity as $\rho \to \infty$ the capacitance is represented by a simple dielectric mixture. By contrast, as resistivity reduces to zero as $\rho \to 0$, the capacitance is represented by an artificial dielectric. For example, increasing light intensity decreases resistivity along the abscissa 110, and in turn increases capacitance. The parameters listed in FIG. 2 are common of many of the materials that compose the optically controllable AD, or tunable pigment ink 1140. In particular, the dielectric constant for the particulate 1230 is for GaAs and for the binder 1220, being typical for PMMA. Physically, artisans of ordinary skill can recognize that the ink 1140 moves from a dielectric mixing response at high resistivity to an artificial dielectric response at low resistivity.

In some applications, resistive loss is not desirable and should be minimized. The peak in resistive loss of tunable pigment based ink 1140 can be determined by mathematical means from eqn. (16) as:

$$R_{s-peak} = \frac{L}{A} \frac{V_f^{1/3}}{2\omega\gamma}. \quad (17)$$

From eqn. (17), one advantage of the exemplary process is that the maximum resistive loss is inversely proportional to frequency.

Thus, the loss can be very small for high frequencies. Using the parameters listed in FIG. 2, the loss can be plotted as a function of frequency as shown in FIG. 4. As can be observed from eqn. (17) and FIG. 4, the loss becomes diminishingly small at high frequencies. Dependent on applications, the composite inks offer two different functions, tunable photo-capacitance and tunable photo-resistance. Both functions are optically controlled and can be easily integrated into various tunable devices. FIG. 4 shows the plot view 400 with the resistive loss as a function of frequency.

Another advantage of exemplary embodiments, as demonstrated in this model, is that the range of capacitance can be enhanced using various techniques. The change in capacitance can be determined by mathematical means from eqn. (14) as:

$$\frac{\Delta C_s}{C_s} = \frac{C_s|_{\rho \to 0} - C_s|_{\rho \to \infty}}{C_s|_{\rho \to \infty}} = \frac{V_f^{1/3} \varepsilon_b}{\gamma(1 - V_f^{1/3})}. \quad (18)$$

By increasing the volume fraction of particulates, the capacitance range increases as shown in FIG. 5, where the parameters listed in FIG. 2 have been used. This can be accomplished by adding more particulate material.

Range of capacitance in the tunable ink 1140 as a function of fractional volume of particulates for the parameters listed in FIG. 2. Capacitance range can also be enhanced by increasing the dielectric constant of the binder 1220. This is shown in FIG. 6, again using the parameters of FIG. 2. Range of capacitance in the tunable ink as a function of the binder dielectric constant for the parameters listed in FIG. 2.

The reason the capacitance range increases with increasing binder dielectric constant is that the electric field interaction between particulates is stronger thus enhancing the artificial dielectric effect at small resistances in FIG. 1. Capacitance range also increases when the particulate dielectric constant decreases.

Another aspect of exemplary embodiments involves adding a third component (or even higher order number of components) to the tunable ink to make enhance capacitance range. The technique is known as dielectric mixing. Typically, one mixes a high dielectric material to increase a lower dielectric material, such as a high dielectric powder to a low dielectric polymer binder, to enhance the dielectric strength of the mixture while maintaining the structural or adhesive properties of the polymer. The technique can be used for the tunable pigment ink 1140 to enhance the interaction between the active particulates, thus enhancing the capacitance range.

Another important advantage of exemplary embodiments involves the capacitance and resistance as described by eqns. (14) and (16) not being functions of voltage. This means that changes in signal amplitude do not influence the impedance of the tunable ink significantly. For example, in a tuned inductive-capacitive tank circuit, the resonant frequency does not shift with signal voltage in the case of tunable ink, which is a major advantage. Changes in capacitance due to changes in signal voltage can add harmonic generation to the signal which is often undesirable.

FIGS. 9 and 10 show data for a tunable pigment ink using GaAs particulates in a PMMA binder in which the signal voltage adjusts from 0.005 V to 20 V with no significant change in capacitance. The data are shown for two different light intensity levels, and thus for two different capacitances. Data show only a minor variation in capacitance as a function of signal voltage for two different optical intensities. Other effects can enhance or decrease the range of capacitance or resistance in exemplary embodiments, and the examples above demonstrate major advantages.

Different formulations have been attempted by varying the GaAs particle size. For a particular GaAs size, several formulations with varying volume fractions of GaAs particulates 1230 to polymer binder 1220 were also evaluated. Photo-capacitance has been observed in all samples. However, there were significant differences in the amount of photo-capacitance observed. For GaAs particles, a size of about 0.5 mm×0.5 mm×1.00 mm in a volume of GaAs to polymer, provided the largest photo-capacitance effect of all formulation attempted.

To date, a formulation has not been produced with a photo-capacitance effect as large as in single crystal GaAs, which has effectively a volume fraction ratio of unity, or $V_f=1$. However, the measured effect of the inks produced thus far is sufficiently inclusive to be used in many applications including tunable MMs.

Particulates of GaAs particles 1230 in wax have also been found to be translucent to infrared, and again photo-capacitance and photo-resistance was observed. Semi-insulating GaAs has also been used in experiments, but as the theory indicates, any photo-conductive material can be used for the particulates 1230 including photo-conductive polymers, for example. Tunable metamaterials have great potential in everything related to electromagnetics. The photo-capacitive ink 1140 can accelerate the implementation of many commercial applications.

Exemplary embodiments provide a process to optically control the effective permittivity of an artificial dielectric and enables the active inclusions to be fabricated from pulverized semi-insulating material. The electric dipoles from the inclusions are controlled by photo-generation of charge carriers using infrared light. An infrared transparent binder provides the matrix material. An important feature of the exemplary process is that the permittivity is linear with electric field intensity over a useable parameter space.

The primary application involves a pigment based ink 1140, or paint, to be utilized as a tuning mechanism for metamaterials and other resonant based structures. Other applications include a controllable gradient index lens in which inhomogeneous light intensity can provide a dynamic response for focusing or steering of beams, and RF circuit elements including filters, phase delays, antennae and other microwave devices.

Frequency selective surfaces (FSS) are EM materials that also have a periodic arrangement of resonant conductive inclusions that can be used to control EM radiation. The FSS is typically fabricated in planar form to control the transmission or reflection properties of EM radiation. In terms of wave propagation in a periodic structure, the FSS utilizes the optical branch and the MM utilizes the acoustic branch. The electromagnetic bandgap (EMB) between these branches provides a stop-band that is useful to minimize surface waves, for example.

Exemplary embodiments provide dynamic control to the effective permittivity of an AD by using light by exploiting photo-conductive particulates 1230 in place of the fixed conductors used for static ADs. Infrared light is used to "short out" the parasitic capacitance of the particulates leaving only the series capacitance between the particulates.

The change in internal capacitance appears as a constituent change in permittivity for wavelengths much greater than the particulate size and spacing. As a dynamically controllable AD by optical photon stimuli, the notion of a controllable lens in which an EM beam can be focused to various lengths, or steered in different directions comes to mind. Of particular interest is the incorporation of these materials as a pigment based ink 1140 that can be printed at low cost to tune resonant MM, EBG and FSS structures, or RF components such as filters, phase delays and small antennae.

In experimental results, active particulates 1230 were prepared by pulverizing USI GaAs using a mortise and pedestal. The slightly n-type USI GaAs had a room temperature resistivity of $2.3 \times 10^7$ Ω-cm. Once pulverized, the particulates 1230 were embedded in one of several types of matrix materials for the binder 1220 including poly(methyl methacrylate) (PMMA) or semiconductor grade mounting wax. In both cases, the matrix binder 1220 was sufficiently transparent to infrared light necessary to enable deep activation of the USI GaAs particulates 1230. Scanning electron micrographs of the pulverized material through various stages of preparation are shown in FIG. 13 as USI GaAs particulates. These views 1300 for pulverized USI GaAs include first size 1310, second size 1320, third size 1330 and after size sorting 1340.

The ink 1140 was formed over various gap widths between two copper strips. The length of the gap for all cases was 0.5 cm, and the ink 1140 overlapped the copper electrodes 1130 at the gap edges by approximately 0.3 cm. Attempts were made to control the thickness and overlap of the ink 1140 although variations did occur. Typical ink thicknesses were on the order of 0.1 cm. Low frequency signals were found to aid in accurate resistive loss measurements. An HP-4284A precision LCR meter 1150 capable of frequencies up to 1 MHz was used for the measurements in series resistance-capacitance mode. A 100 mV signal voltage was employed to measure the complex impedance as a function of optical power density, gap length and probe frequency. A power calibrated yttrium doped fiber laser with wavelength $\lambda=1.07$ μm was used to illuminate the sample uniformly. Measurements were acquired at room temperature in a darkened room.

Results for capacitance and resistance for various gap sizes are shown in FIGS. 7 and 8 respectively for a typical sample. Although particle size included varied particulate, the range of 0.025 cm to 0.050 cm was found to be optimal for USI GaAs and these values are assumed unless otherwise noted. From FIG. 7, the percent change in capacitance between 0 mW/cm$^2$ and 500 mW/cm$^2$ illumination is 62%, 58%, 45% and 35% for gaps of 0.05 cm, 0.1 cm, 0.2 cm and 0.3 cm, respectively. That the smallest gap has the highest change in capacitance may have to do with the particulate size being of the same order as the gap, thus representing more of a single crystal effect rather than an AD effect.

In FIG. 8, each resistance curve has a characteristic peak. The peak is attributed to the manner in which the particulates interact to form the imaginary part of the net series impedance. FIGS. 7 and 8 show series capacitance and series resistance measurements for dynamically controllable ink 1140 based on pulverized USI GaAs pigment 1230 as a function of power density.

FIGS. 9 and 10 show the capacitance and resistance for a typical sample as a function of signal voltage showing a clear tendency towards signal voltage independence. This is in contrast to the typical varactor method of tuning that uses depletion capacitance, which in turn is a function of signal voltage. Thus, the ink can be important for tuning applications in which signal amplitudes vary. FIGS. 9 capacitance and 10 resistance measurements for dynamically controllable ink 1140 based on pulverized USI GaAs pigment as a function of signal voltage for two different optical power densities.

From the capacitor viewpoint, one can first derive the effective permittivity from the single unit cell model 1210. Then one can show that the permittivity derived from the cell model 1210 indeed represents the effective permittivity of the bulk material. Assume the electric field is directed from top to bottom on the cell model, which is modeled as a series connection of two sections from top to bottom separated by the particulate 1230.

Results for capacitance and resistance for various gap sizes are shown in FIGS. 7 and 8 respectively for samples with particulate sizes ranging over 0.025 cm to 0.040 cm. Effects from the substrate 1120 were subtracted from the data by assuming a lossless capacitance in parallel with the capacitance of the composite dielectric on the opposing side of the electrodes 1160. Using the analysis by T. Chen et al.: Analysis of a Concentric Coplanar Capacitive Sensor Using a Spectral Domain Approach", *Review of Progress in Quantitative Nondestructive Evaluation,* 30 AIP Conf. Proced. 1335 1647-1654 (2011) and U.S. Pat. No. 8,791,707 for materials on coplanar electrodes 1160, substrate capacitances of 0.22, 0.18, 0.14, 0.12 pF have been calculated for gap widths of 0.05, 0.1, 0.2, 0.3 cm respectively. A relative dielectric constant for FR-4 of 4.8 was used for the substrate 1120 at 1 MHz in the calculation. The analysis in Chen (2011) does not account for skin effect in the calculations.

The anticipated trend of increasing composite capacitance with increasing optical power density is evident as the particulate capacitance changes to conductive behavior. From FIG. 7, the percent changes in capacitance between 0 mW/cm$^2$ and 500 mW/cm$^2$ illumination for gaps of 0.05, 0.10, 0.20, 0.30 cm are 87, 84, 60, 53% respectively. That the largest gaps have the smallest change in capacitance is likely associated with a larger portion of electric flux lying outside of the composite, thereby diluting the effect as discussed by Chen et al.

Another contribution could be due the granularity of the matrix as compared to the smaller gaps. In the limiting case of a single particulate making intimate contact with the electrodes, the inter-particulate capacitance stems only from the depletion regions within the USI GaAs. Single crystal configurations have been reported to produce dramatic change in capacitance.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A dielectric composite material for electrical switch control by optical stimulus, said material comprising:
   a plurality of photo-conductive particulates; and
   a transparent binder for containing said plurality of particulates to form a photo-conductive pigment based matrix, wherein
   said pigment based matrix is disposed on to overlap first and second separate electrodes to produce an electrical junction, and
   capacitance of said pigment based matrix changes from a first value absent the optical stimulus to a second value in response to illumination at a specific electromagnetic frequency and intensity by the optical stimulus, wherein said particulates are composed of undoped semi-insulating gallium arsenide (USI GaAs).

2. The material according to claim 1, wherein said pigment based matrix forms an ink.

3. The material according to claim 2, wherein said ink transforms from liquid to solid states in response to a curing stimulus.

4. The material according to claim 1, wherein said binder is composed of poly-(methyl methacrylate) (PMMA).

* * * * *